United States Patent Office 2,799,256
Patented July 16, 1957

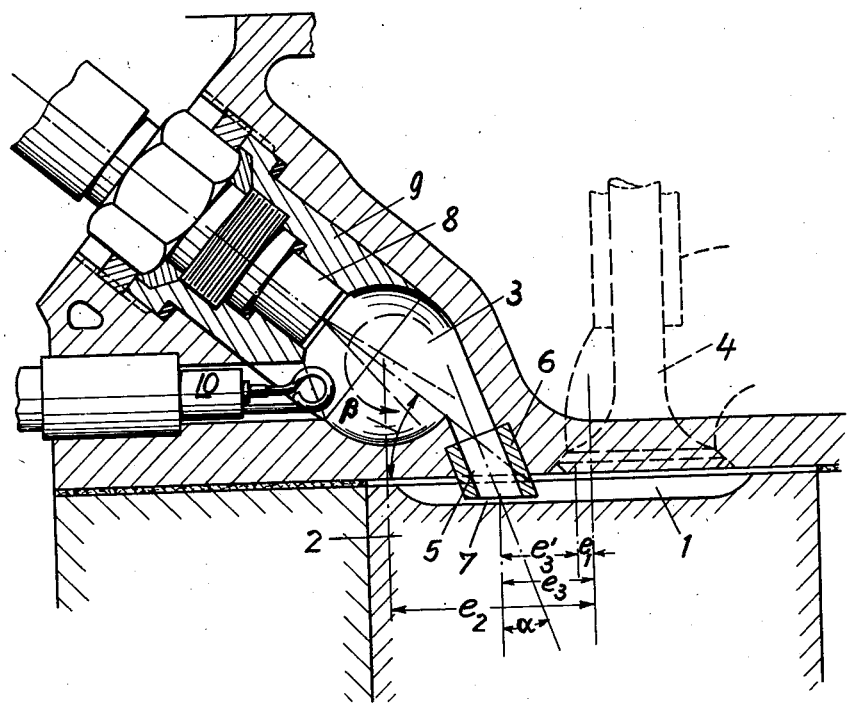

2,799,256

FUEL-INJECTION ENGINE

Eugen Stump, Stuttgart-Unterturkheim, Germany, assignor to Daimler-Benz Aktiengesellschaft, Stuttgart-Unterturkheim, Germany Application May 23, 1955, Serial No. 510,324
In Germany October 1, 1948

Public Law 619, August 23, 1954
Patent expires October 1, 1968

8 Claims. (Cl. 123—32)

The present invention relates to a fuel-injection engine of the type operating with air compression and self-ignition in which at the end of the compression stroke a part of the compressed air is located in a precombustion chamber which is disposed laterally within the cylinder head and into which liquid fuel is injected near the end of the compression stroke by means of an injection nozzle which opens into the precombustion chamber.

It is an object of the present invention to produce a mixture of the fuel and air as intimate as possible and thus to achieve a combustion of the injected fuel which is as complete as possible.

Another object of the present invention is to distribute the fuel and air mixture produced in the precombustion chamber even though the precombustion chamber might be located a considerable distance away from the cylinder axis, especially for the purpose of providing inlet and outlet valves as large as possible.

A further object of the present invention is to achieve a very favorable turbulence of the air and fuel in the precombustion chamber, and at the same time to distribute the contents of the precombustion chamber produced therein toward all sides of the main combustion chamber by means of a jet directed from the precombustion chamber in all directions when the piston is in its upper dead-center position.

An essential feature of the present invention therefore consists in a precombustion chamber which is disposed eccentrically to the cylinder axis and connected with the main combustion chamber by means of a channel which together with the piston head in its upper dead-center position forms a narrow annular slot and is inclined relative to the cylinder axis at a relatively small angle of, for example, about 30°, while the axis of the injection nozzle and fuel jet form a larger angle relative to the cylinder axis.

Another feature of the invention consists in forming the precombustion chamber similar to a turbulence chamber into which the connecting channel extends tangentially and the fuel jet preferably diametrally. The fuel is thus intimately mixed with the revolving air current. Since the outlet channel extends at a steeper angle toward the piston head than the fuel jet, the effect of the annular slot which distributes the fuel mixture uniformly over the entire main combustion chamber remains practically unchanged, while aside from the favorable direction of injection transversally through the precombustion chamber the injection nozzle will be very easily accessible from the side. If the eccentricity of the main combustion chamber relative to the cylinder axis, of the connecting channel between the precombustion chamber and the main combustion chamber relative to the latter, and of the precombustion chamber relative to the main combustion chamber is made of the proper value or dimension, it will be possible to obtain a precombustion chamber which lies far outside of the cylinder axis even though the fuel or the content of the precombustion chamber will be very uniformly distributed over the main combustion chamber as well as the cylinder.

If the annular slot be provided only near the upper dead-center position of the piston, while otherwise the flow of air into the precombustion chamber will be relatively unrestricted, the combination thereof with the tangentially disposed by-pass will result in highly advantageous flow and turbulence conditions in the precombustion chamber.

Further objects, features, and advantages of the present invention will appear from the following detailed description thereof as well as from the accompanying drawing which shows a cross section through the precombustion chamber and the cylinder axis of the engine according to one preferred embodiment of the invention, which may be, for example, a diesel engine for an automobile.

Referring to the drawing, the main combustion chamber 1 consists of a recess in the piston head 2 which has a degree of eccentricity of $e_1$. The spherical or cylindrical precombustion chamber 3 is disposed within the water-cooled cylinder head toward one side above the cylinder at a degree of eccentricity of $e_2$ relative to the cylinder axis adjacent to the valves 4, for example, a pair of inlet and outlet valves which are disposed symmetrically relative to the plane of the drawing. Precombustion chamber 3 communicates with the main combustion chamber by means of a by-pass 5 in the form of an insert 6, the mouth opening of which projects into the main combustion chamber 1 to such an extent that a narrow annular slot 7 will be formed between the insert 6 and the recessed piston head 2. The outlet opening of the by-pass 5 is given a degree of eccentricity $e_3$ relative to the cylinder axis or a degree of eccentricity $e_a'$ relative to the central axis of the main combustion chamber 1, which latter eccentricity amounts to about 0.3 to 0.4 times the radius of the main combustion chamber 1. The inclination $\alpha$ of the by-pass 5 relative to the cylinder axis amounts to about 20°. By such degree of eccentricity and inclination the outflowing contents of the precombustion chamber 3 will be distributed in a highly advantageous manner. The by-pass 5 also terminates into the precombustion chamber 3 in a tangential direction in such a manner that the center of the latter will lie at the side of the channel opposite to the cylinder axis, a fact which still further improves the distribution of the space within the cylinder head insofar as the arrangement of the valves and the chambers for the cooling water is concerned. At the same time, such arrangement results in very favorable injection conditions since the fuel jet may be injected into the precombustion chamber near the mouth of the by-pass and in a direction transversally through the precombustion chamber. The injection nozzle 8 is preferably fitted into a suitable bore in the cylinder head by means of a socket 9, the axis of which coincides with the axis of the precombustion chamber 3 and is inclined toward the plane of the piston head at an angle $\beta$ of about 40°. The location of the glow plug is indicated by the numeral 10.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A fuel injection engine comprising a cylinder, a piston adapted to reciprocate upwardly and downwardly in said cylinder, a main combustion chamber above said piston, a precombustion chamber laterally of and above said cylinder, an injection nozzle extending into said precombustion chamber and emitting a fuel jet in a direction toward said piston and inclined relative to the axis of said cylinder, a channel connecting said precombustion chamber and main combustion chamber and likewise extending in a direction toward said piston and inclined relative to the axis of said cylinder, said channel extending toward said piston head to such an extent that when said piston is in its upper dead-center position the wall of said channel defining the mouth thereof forms an annular slot having a width considerably smaller than the height of said main combustion chamber, the axis of said connecting channel forming a smaller angle relative to said cylinder axis than the axis of said fuel jet, said precombustion chamber constituting substantially a body of revolution, and said connecting channel extending tangentially into said precombustion chamber at the side thereof adjacent to said cylinder axis.

2. A fuel injection engine as defined in claim 1, wherein said fuel jet is injected substantially diametrally into said precombustion chamber in a direction toward said connecting channel.

3. A fuel injection engine as defined in claim 1, wherein said piston is provided with a recess defined by the unrecessed surface edge of said piston head and forming the main combustion chamber of said engine, and wherein the channel wall defining the mouth of said connecting channel projects into the cylinder chamber, said channel mouth extending on all sides into said recess in said piston and together with the bottom of said recess forming said annular slot, and further comprising an insert forming at least a part of the walls of said connecting channel including the wall defining the mouth of said channel projecting into the cylinder chamber.

4. A fuel injection engine as defined in claim 1, wherein the axis of said connecting channel is disposed at an angle of no more than 30° relative to the axis of said fuel jet, and wherein the axis of said fuel jet is disposed at an angle of more than 30° relative to said cylinder axis.

5. A fuel injection engine as defined in claim 1, wherein the axis of said connecting channel is disposed at an angle of substantially 15 to 30°, and the axis of said fuel jet at an angle of substantially 35 to 50° relative to said cylinder axis.

6. A fuel injection engine as defined in claim 1, wherein the axis of said connecting channel is disposed at an angle of substantially 20° and the axis of said fuel jet at an angle of substantially 40° relative to said cylinder axis, and wherein the center of said precombustion chamber is disposed substantially above the periphery of said cylinder.

7. A fuel injection engine as defined in claim 6, wherein said piston is provided with a recess defined by the unrecessed surface edge of said piston, and wherein the channel wall defining the mouth of said connecting channel projects into said cylinder chamber so that the annular slot extends on all sides into said recess in said piston.

8. A fuel injection engine as defined in claim 1, wherein said piston is provided with a recess forming at least part of said combustion chamber, and said recess being disposed eccentrically relative to said cylinder axis toward the side of said precombustion chamber, and wherein said mouth of said connecting channel is likewise disposed eccentrically toward the side of said precombustion chamber relative to said recess.

References Cited in the file of this patent
UNITED STATES PATENTS
2,674,983     Kraus _____ Apr. 13, 1954

OTHER REFERENCES
Ser. No. 368,293, Von Mallinckrodt (A. P. C.), published May 11, 1943.